United States Patent
Mizutani et al.

(10) Patent No.: US 10,742,454 B2
(45) Date of Patent: Aug. 11, 2020

(54) TRANSMISSION DEVICE, TRANSMISSION METHOD, RECEPTION DEVICE, AND RECEPTION METHOD

(71) Applicant: KYOTO UNIVERSITY, Kyoto-shi (JP)

(72) Inventors: Keiichi Mizutani, Kyoto (JP); Hiroshi Harada, Kyoto (JP); Takeshi Matsumura, Kyoto (JP); Yosuke Kodama, Kyoto (JP)

(73) Assignee: KYOTO UNIVERSITY, Kyoto-shi (JP)

( * ) Notice: Subject to any disclaimer, the term of this patent is extended or adjusted under 35 U.S.C. 154(b) by 0 days.

(21) Appl. No.: 16/466,941

(22) PCT Filed: Nov. 29, 2017

(86) PCT No.: PCT/JP2017/042820
§ 371 (c)(1),
(2) Date: Jun. 5, 2019

(87) PCT Pub. No.: WO2018/110279
PCT Pub. Date: Jun. 21, 2018

(65) Prior Publication Data
US 2020/0084070 A1   Mar. 12, 2020

(30) Foreign Application Priority Data
Dec. 13, 2016 (JP) ................ 2016-241637

(51) Int. Cl.
*H04L 25/03* (2006.01)
*H04L 5/00* (2006.01)
*H04L 27/26* (2006.01)

(52) U.S. Cl.
CPC ...... *H04L 25/03159* (2013.01); *H04L 5/0007* (2013.01); *H04L 27/2607* (2013.01); *H04L 27/2636* (2013.01); *H04L 27/2647* (2013.01)

(58) Field of Classification Search
CPC ............. H04L 25/03159; H04L 5/0007; H04L 27/2607; H04L 27/2636; H04L 27/2647
See application file for complete search history.

(56) References Cited

U.S. PATENT DOCUMENTS

| 7,023,937 B2* | 4/2006 | Redfern ............. H04L 27/2647 370/201 |
| 2008/0002645 A1* | 1/2008 | Seki .................. H04L 25/03834 370/338 |

(Continued)

FOREIGN PATENT DOCUMENTS

| JP | 2008-11037 A | 1/2008 |
| JP | 2009-212586 A | 9/2009 |

(Continued)

OTHER PUBLICATIONS

Kodama, Y., et al., "Universal Time-domain Windowed Single Carrier Frequency-domain Equalization," IEICE Technical Report, vol. 116, No. 383, Dec. 14, 2016, 7 pages (with English abstract).

*Primary Examiner* — Freshten N Aghdam
(74) *Attorney, Agent, or Firm* — Oblon, McClelland, Maier & Neustadt, L.L.P.

(57) ABSTRACT

Provided is a transmission device of a single carrier frequency-domain equalization scheme having a circuit in which a cyclic prefix (CP) and an overlap margin (OM) are inserted, and a time-domain windowing processing circuit to which is input a transmission symbol into which the CP and the OM have been inserted. The time-domain windowing processing circuit multiplies an arbitrary time-domain window function and suppresses out-of-band emission. In the time-domain windowing processing circuit, a window transition length of the time-domain window function is equal to or larger than a length of the CP.

5 Claims, 12 Drawing Sheets

(56) References Cited

U.S. PATENT DOCUMENTS

| | | | |
|---|---|---|---|
| 2008/0118012 A1* | 5/2008 | Corke | ............... H04L 27/2647 |
| | | | 375/348 |
| 2010/0329373 A1 | 12/2010 | Kameya | |
| 2015/0372843 A1 | 12/2015 | Bala et al. | |
| 2016/0269212 A1* | 9/2016 | Vilaipornsawai | ... H04L 27/2627 |
| 2017/0310509 A1* | 10/2017 | Qian | .................. H04L 25/022 |

FOREIGN PATENT DOCUMENTS

| | | |
|---|---|---|
| JP | 2011-14982 A | 1/2011 |
| WO | WO 2014/123926 A1 | 8/2014 |

* cited by examiner

TRANSMISSION DEVICE, TRANSMISSION METHOD, RECEPTION DEVICE, AND RECEPTION METHOD

TECHNICAL FIELD

The present invention relates to a transmission device, a transmission method, a reception device and a reception method which are applicable to a single carrier frequency-domain equalization scheme.

TECHNICAL BACKGROUND

Currently, in LTE (Long Term Evolution) and LTE-Advanced, which are becoming a mainstream as mobile communication systems, an orthogonal frequency division multiplexing (OFDM) scheme as a downlink signal waveform and a single carrier frequency-domain equalization (SC-FDE) scheme as an uplink signal waveform are used. In a 5-th generation mobile communication system (5G system), further improvement in frequency utilization efficiency is demanded. As a new signal waveform for realizing the improvement in the frequency utilization efficiency, research and development on a waveform shaping technology based on conventional schemes are in progress.

However, the conventional waveform shaping technology is mainly studied based on a downlink OFDM scheme, and there are few studies on an uplink SC-FDE scheme. The SC-FDE scheme has a feature that a peak-to-average power ratio (PAPR) is low as compared to the OFDM scheme, and can reduce a back off margin of a power amplifier mounted on a transmitter, and thus is very effective as a transmission waveform on a terminal side. On the other hand, the SC-FDE scheme has high out-of-band emission (OOBE), and, in terms of frequency utilization efficiency, OOBE suppression has been a problem to be solved.

In order to suppress out-of-band emission, a low pass filter (LPF) is effective. However, for example, in LTE, a guard bandwidth in a band is only about 0.25 MHz at most remaining on both sides. A large amount of calculation is required in order to mount an LPF that sufficiently suppresses out-of-band emission within this narrow guard band.

The inventors of the present application have proposed a universal time-domain windowed orthogonal frequency division multiplexing (UTW-OFDM) scheme regarding an OFDM (A) signal transmission device without using an LPF (see Patent Document 1).

RELATED ART

Patent Document

Patent Literature 1: Japanese Patent Laid-Open Publication No. 2015-207834.

SUMMARY OF THE INVENTION

Problems to be Solved by the Invention

As described above, the disclosure of Patent Document 1 is directed to an OFDM or OFDM (A) scheme. Therefore, the SC-FDE scheme does not solve the problem that OOBE is high and frequency utilization efficiency is poor.

Therefore, a purpose of the present invention is to provide a transmission device, a transmission method, a reception device and a reception method based on a universal time-domain windowed single carrier frequency-domain equalization (universal time-domain windowed SC-FDE; UTW-SC-FDE) as a new physical layer signal waveform that improves frequency utilization efficiency of the SC-FDE scheme.

Means for Solving the Problems

The present invention provides a transmission device of a single carrier frequency-domain equalization scheme that includes: a circuit in which a cyclic prefix (CP) and an overlap margin (OM) are inserted; and a time-domain windowing processing circuit to which is input a transmission symbol into which the CP and the OM have been inserted. The time-domain windowing processing circuit multiplies an arbitrary time-domain window function and suppresses out-of-band emission. In the time-domain windowing processing circuit, a window transition length of the time-domain window function is equal to or larger than a length of the CP.

Further, the present invention provides a transmission device of a single carrier frequency-domain equalization scheme that includes multiple time-domain windowing processing circuits. A transmission symbol into which a CP and an OM have been inserted is divided into multiple groups for each resource element and symbols of the groups are input to the multiple time-domain windowing processing circuits. The multiple time-domain windowing processing circuits each multiply an arbitrary time-domain window function and suppress out-of-band emission.

Further, the present invention provides a reception device in which, with respect to a reception primary modulation symbol obtained by performing FFT processing, channel equalization, and IDFT processing with respect to a reception data symbol of an SC-FDE scheme, an amplitude level is compensated by performing de-windowing processing in which an inverse number of a window function that is multiplied on a transmitting side is multiplied.

Further, the present invention provides a transmission method of a single carrier frequency-domain equalization scheme that includes: processing in which a CP and an OM are inserted; and time-domain windowing processing in which is input a transmission symbol into which the CP and the OM have been inserted. In the time-domain windowing processing, an arbitrary time-domain window function is multiplied and out-of-band emission is suppressed.

Further, the present invention provides a reception method in which, with respect to a reception primary modulation symbol obtained by performing FFT processing, channel equalization, and IDFT processing with respect to a reception data symbol of an SC-FDE scheme, an amplitude level is compensated by performing de-windowing processing in which an inverse number of a window function that is multiplied on a transmitting side is multiplied.

Effect of Invention

According to the present invention, by combining application of a long and large UTW and a powerful channel encoding technology, out-of-band emission (OOBE) that is a problem from a point of view of frequency utilization efficiency can be efficiently suppressed without deterioration in communication quality or while an amount of deterioration in communication quality is suppressed. This can be realized by adding only minor modification on a conventional transmitting side. Further, on a receiving side, a receiver configuration of a conventional scheme can be used as it is. Therefore, affinity with conventional schemes is high. Further, by adding minor modification to compensate amplitude distortion due to UTW on a receiver side, communication quality can be improved. The effects described herein are not necessarily limited, and may be any effect described in the present invention. Further, content of the present invention is not to be interpreted in a limited manner by effects exemplified in the following description.

MODE FOR CARRYING OUT THE INVENTION

Figure 1:
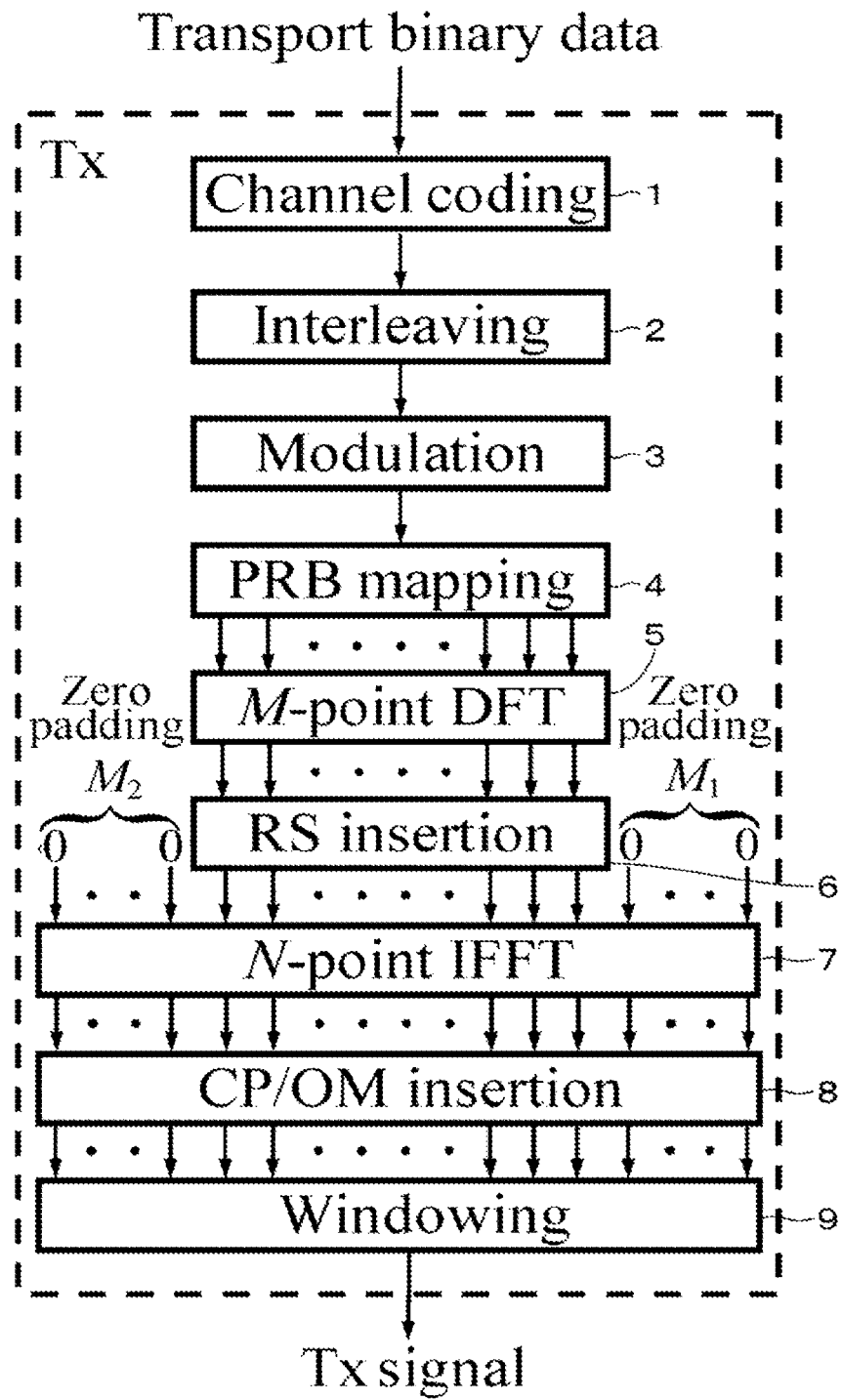
FIG. 1 is a block diagram illustrating a configuration of a transmitter of an embodiment of the present invention.

In the following, an embodiment of the present invention is described. An embodiment to be described below is a preferred embodiment of the present invention and has various technically preferable limitations. However, the scope of the present invention is not to be limited to these embodiments unless specifically stated in the following description that the present invention is to be limited.

The following description is given in the following order:
<1. SC-FDE Scheme>
<2. Embodiment (UTW-SC-FDE Scheme)>
<3. Evaluation of Characteristics>
<4. Modified Embodiment>

1. SC-FDE Scheme

Procedures for generating a transmission signal of an SC-FDE scheme are described below. An m-th primary modulation symbol of a k-th SC-FDE symbol is denoted using $a_{(k, m)}$.

First, multiple symbols of (Mathematical Formula 1) are subjected to M-point discrete Fourier transform (DFT) processing, and results are represented by Equation (1) and Equation (2).

[Mathematical Formula 1]

$$a_k = [a_{(k,0)}, a_{(k,1)}, \ldots, a_{(k,M-1)}]^T \in \mathbb{C}^M$$

[Mathematical Formula 2]

$$z_k = F_M a_k \quad (1)$$

[Mathematical Formula 3]

$$(F_l)_{(p_1, p_2)} = \exp[-2\pi p_1 p_2 / l] \quad (2)$$

Here, M is the number of modulation symbols contained in one SC-FDE data symbol, and $0 \leq p_1 < M$ and $0 \leq p_2 < M$. Next, a vector $x_k$ (Mathematical Formula 4, Equation (3)) is generated, in which a transmission vector $z_k$ after DFT processing is mapped to an element corresponding to an assigned frequency band and 0 is mapped to other elements.

[Mathematical Formula 4]

$$x_k = [0^{1 \times M_1}, z_k^T, 0^{1 \times M_2}]^T \quad (3)$$

Here, $M_1 \geq 0$, $M_2 \geq 0$ and $M + M_1 + M_2 = N$, and (Mathematical Formula 5) is a zero matrix of P rows and Q columns.

[Mathematical Formula 5]

$$0^{P \times Q}$$

By subjecting the vector $x_k$ to N-point inverse fast Fourier transform (IFFT) processing, an SC-FDE data symbol vector (Mathematical formula 6) (Equation (4)) is generated.

[Mathematical Formula 6]

$$s_k \in \mathbb{C}^N$$

[Mathematical Formula 7]

$$s_k = F_N^{-1} x_k \quad (4)$$

Here, N ($\geq M$) is a number of time samples of an SC-FDE data symbol. Here, the processing of Equations (3) and (4) can be written as Equations (5) and (6), where $0 \leq q_1 < M$ and $0 \leq q_2 < N$.

[Mathematical Formula 8]

$$s_k = F_S^{-1} z_k \quad (5)$$

[Mathematical Formula 9]

$$(F_S^{-1})_{(q_1, q_2)} = \exp[j 2\pi (q_1 + M_1) q_2 / N] \quad (6)$$

Further, (Mathematical Formula 10) is an inverse discrete Fourier transform (IDFT) matrix. Finally, a CP of a number $N_G$ of time samples is inserted, and an SC-FDE transmission symbol (Mathematical Formula 11) is obtained.

[Mathematical Formula 10]

$$F_S^{-1} \in \mathbb{C}^{N+N_G}$$

[Mathematical Formula 11]

$$s_k^{CP} \in \mathbb{C}^{N+N_G}$$

An SC-FDE transmission signal is generated by concatenating (Mathematical Formula 12). However, discontinuity occurs at a connecting part of (Mathematical Formula 13) and (Mathematical Formula 14), which causes high OOBE to occur.

[Mathematical Formula 12]

$$s_k^{CP} (k=0,1,2,\ldots)$$

[Mathematical Formula 13]

$$s_k^{CP}$$

[Mathematical Formula 14]

$$s_{k+1}^{CP}$$

2. Embodiment (UTW-SC-FDE Scheme)

In a UTW-SC-FDE scheme of the present invention, due to UTW, discontinuity between SC-FDE transmission symbols is eliminated and OOBE is significantly suppressed. Configurations of a transmitter and a receiver for realizing the proposed scheme are described below.

"Transmitter Configuration"

FIG. 1 illustrates a configuration of a transmitter of an embodiment of the present invention. Transmission binary data is supplied to a channel encoder 1 and is channel encoded. An output of the channel encoder 1 is supplied to an interleave circuit 2 and is interleaved. An output of the interleave circuit 2 is supplied to a modulator 3 and is modulated into a complex signal.

An output of the modulator 3 is supplied to a PRB (physical resource block) mapping circuit 4. A symbol from the PRB mapping circuit 4 is supplied to an M-point DFT circuit 5. A transmission symbol from the M-point DFT circuit 5 is supplied to a RS (reference signal) insertion circuit 6.

A transmission symbol in which $M_1$ and $M_2$ 0 symbols are added to an output of the RS insertion circuit 6 is supplied to an N-point IFFT circuit 7, and an SC-FDE data symbol vector is generated. An output of the N-point IFFT circuit 7 is supplied to a circuit 8 in which a CP (Cyclic Prefix) for absorbing influence of a propagation delay and an overlap margin (OM) with an adjacent SC-FDE transmission symbol are inserted.

An output of the CP and OM insertion circuit 8 is subjected to time-domain windowing processing in a time-domain windowing processing circuit 9, and a UTW-SC-FDE transmission symbol is generated. Multiplication by any time-domain window (universal time-domain window; UTW) function is performed, and out-of-band emission is suppressed. Here, the time-domain window function can arbitrarily set a type or a window transition length for each channel, and can be multiplied by any normalization coefficient so that transmission power control in a baseband is enabled. Control of the type and the window transition length of the time-domain window and the normalization coefficient are controlled, for example, by a control device such as a physical layer scheduler. Further, a coefficient of the time-domain windowing processing is specified by a look-up table for the time-domain windowing processing.

Figure 2:
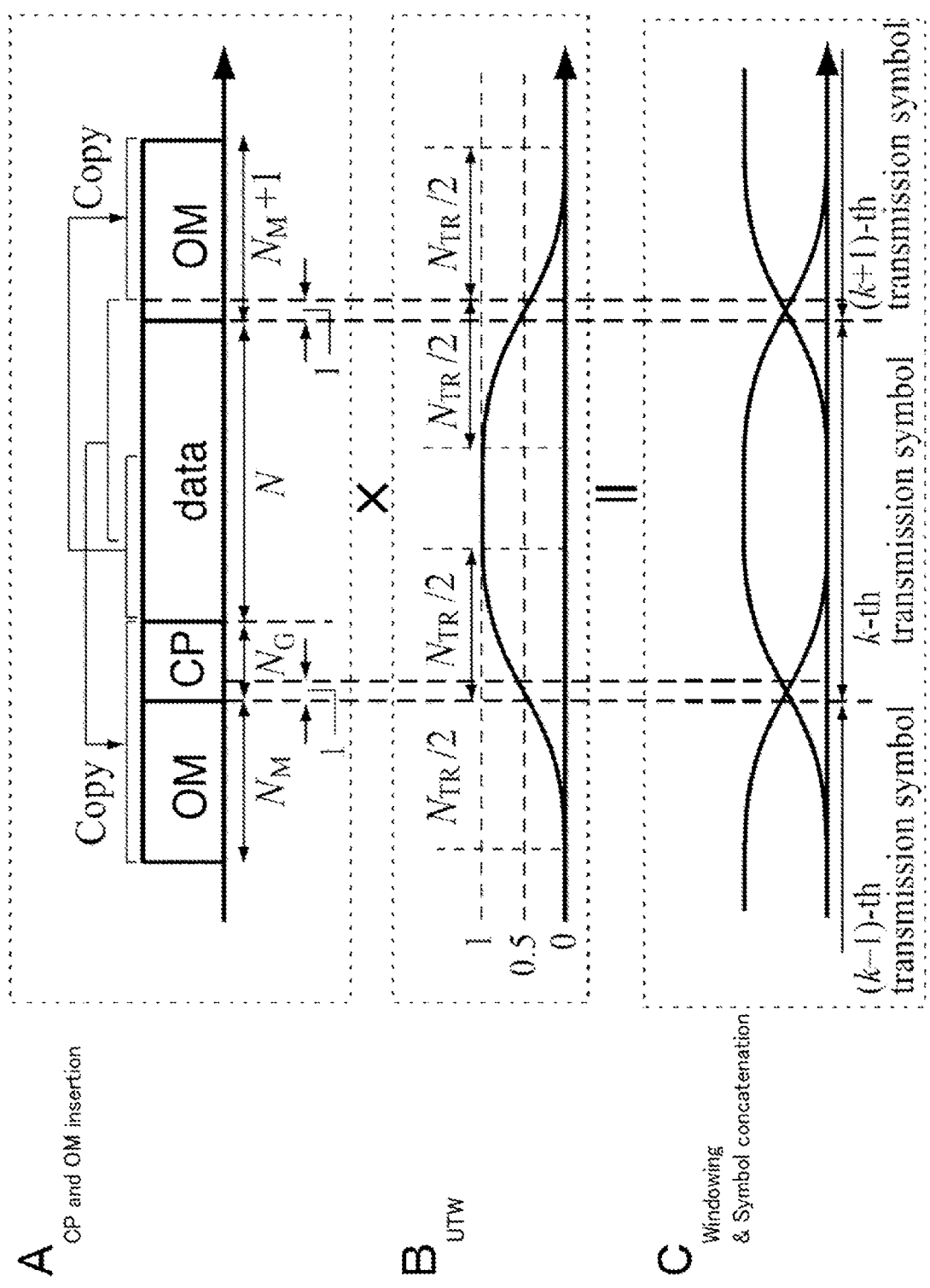
FIG. 2A, FIG. 2B and FIG. 2C are schematic diagrams for describing time-domain windowing processing.

A generation process of a UTW-SC-FDE transmission signal is described with reference to FIG. 2. As illustrated in FIG. 2A, the CP and the OM inserted in the CP and OM insertion circuit 8 are respectively generated by copying front and back of the SC-FDE data symbol. The k-th SC-FDE symbol (Mathematical formula 15) into which are inserted a CP of a sample number $N_G$ and OMs of sample numbers $N_M$ and $N_{M+1}$ respectively at front and back of the symbol is represented by Equation (7).

[Mathematical Formula 15]

$$s_k \in \mathbb{C}^{N_{GM}}$$

[Mathematical Formula 16]

$$s_k = F_{GM}^{-1} x_k \quad (7)$$

Here, $N_{GM} = N + N_G + 2N_M + 1$. Further, (Mathematical formula 17) is an IDFT matrix for which CP and OM insertion has been considered and is expressed by Equation (8).

[Mathematical Formula 17]

$$F_{GM}^- \in \mathbb{C}^{N_{GM} \times N}$$

[Mathematical Formula 18]

$$(F_{GM}^{-1}{}_{(t_1, t_2)}) = \exp[j 2\pi t_1 (t_2 - N_G - N_M)/N] \quad (8)$$

Here, $0 \le t_1 \le N_{GM}$. A k-th UTW-SC-FDE transmission symbol ((Mathematical formula 19) Equation (9)) is generated by multiplying the SC-FDE symbol, in which the CP and the OM have been inserted, by the UTW (see FIG. 2B).

[Mathematical Formula 19]

$$s_k^{UTW} \in \mathbb{C}^{N_{GM}}$$

[Mathematical Formula 20]

$$s_k^{UTW} = W^{UTW} F_{GM}^{-1} x_k \quad (9)$$

Here, (Mathematical Formula 21) is a UTW matrix. Further, diag (•) is a matrix diagonalization operator, and (Mathematical formula 22) is a UTW vector and is generated by Equation (10).

[Mathematical Formula 21]

$$W^{UTW} = \mathrm{diag}(w^{UTW}(\in \mathbb{C}^{N_{GM} \times N_{GM}}$$

[Mathematical Formula 22]

$$w^{UTW} = [w_0^{UTW}, w_1^{UTW}, \ldots, w_{N_{GM}-1}^{UTW}]^T \in \mathbb{C}^{N_{GM}}$$

[Mathematical Formula 23]

$$W^{UTW} = \begin{bmatrix} 0^{(N_M - N_{TR}/2) \times 1} \\ w_{TR} \\ 1^{(N+N_G - N_{TR}+1) \times 1} \\ w_{TR}^I \\ 0^{(N_M - N_{TR}/2) \times 1} \end{bmatrix} \quad (10)$$

Here, (Mathematical Formula 24) is a matrix of which elements of P rows and Q columns are all 1, and (Mathematical Formula 25) and (Mathematical Formula 26) are respectively a UTW transition vector and a UTW reverse transition vector.

[Mathematical Formula 24]

$$1^{P \times Q}$$

[Mathematical Formula 25]

$$w_{TR} \in \mathbb{C}^{N_{GM}}$$

[Mathematical Formula 26]

$$w_{TR}^I \in \mathbb{C}^{N_{GM}}$$

Further, $N_{TR}$ ($\le N$) is the window transition length, and these are expressed by Equation (11) and Equation (12).

[Mathematical Formula 27]

$$w_{TR} = [w_0, w_1, \ldots, w_{N_{TR}-2}, w_{N_{TR}-1}]^T \quad (11)$$

[Mathematical Formula 28]

$$w_{TR}^I = [w_{N_{TR}-1}, w_{N_{TR}-2}, \ldots, w_1, w_0]^T \quad (12)$$

Various window functions can be applied to the UTW. For example, when a raised cosine window function is used, it is expressed by Equation (13).

[Mathematical Formula 29]

$$w_n = \sin^2(n\pi/2N_{TR}) \quad (13)$$

Finally, as illustrated in FIG. 2C, front and back OMs of adjacent transmission symbols are joined so as to overlap each other, and a UTW-SC-FDE transmission signal is generated. However, under a condition of $N_{TR}=0$, a UTW vector (Mathematical formula 30) is expressed by Equation (14). This represents the SC-FDE scheme.

[Mathematical Formula 30]

$$w^{UTW}$$

[Mathematical Formula 31]

$$w^{UTW} = [0^{1 \times NM}, 1^{1 \times (N+N_G+1)}, 0^{1 \times NM}]^T \quad (14)$$

"Receiver Configuration"

In the present invention, basically, a receiver configuration (see FIG. 3) of a conventionally SC-FDE scheme can be used without particular additional processing. However, further improvement in reception quality is possible by performing simple additional processing to compensate signal amplitude distortion due to UTW. Further, FIG. 4 is another receiver configuration in which, in addition to the receiver configuration of FIG. 3, a de-windowing processing circuit 20 for compensating amplitude distortion is added.

Figure 3:
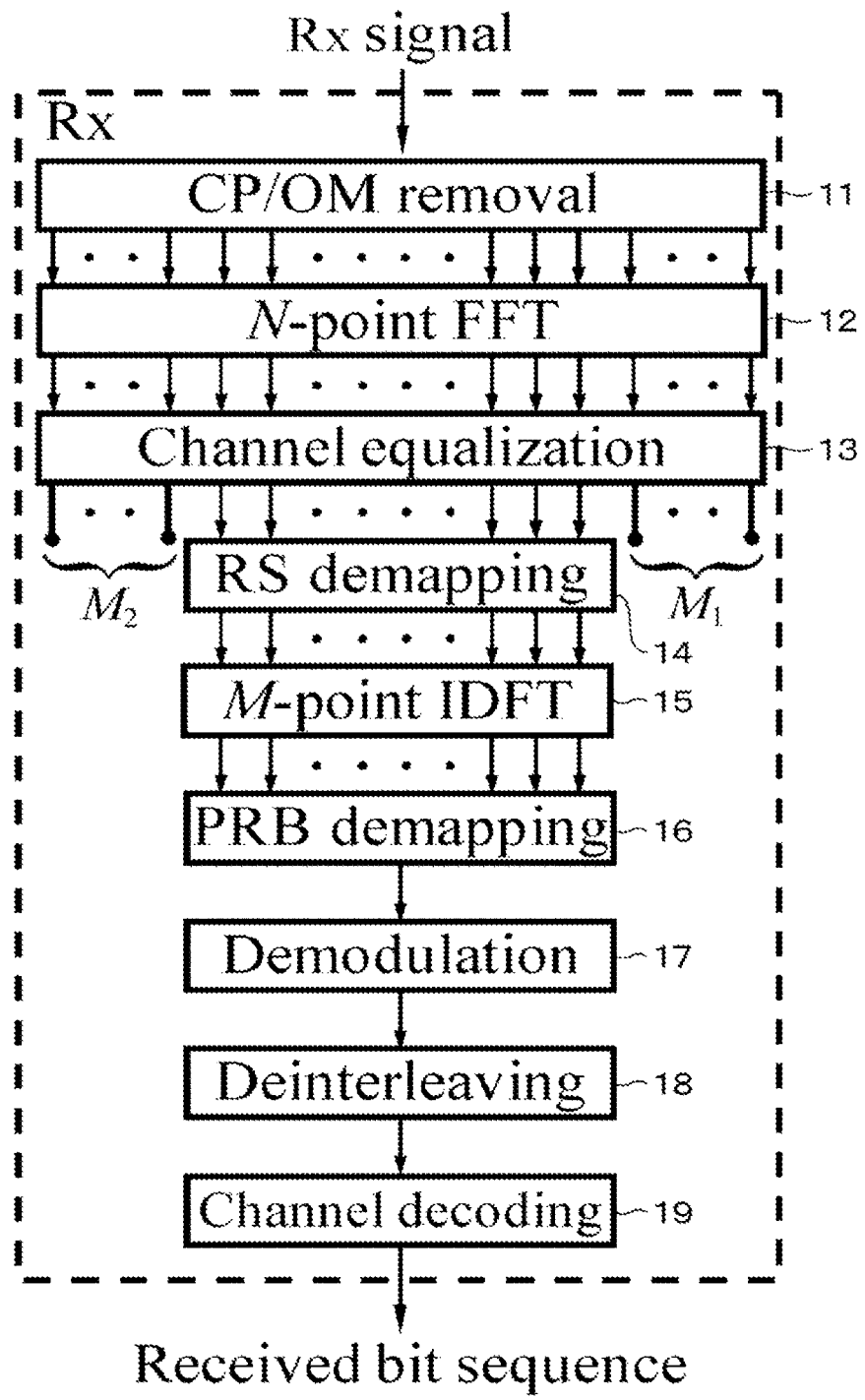
FIG. 3 is a block diagram illustrating a conventional receiver configuration.
Figure 4:
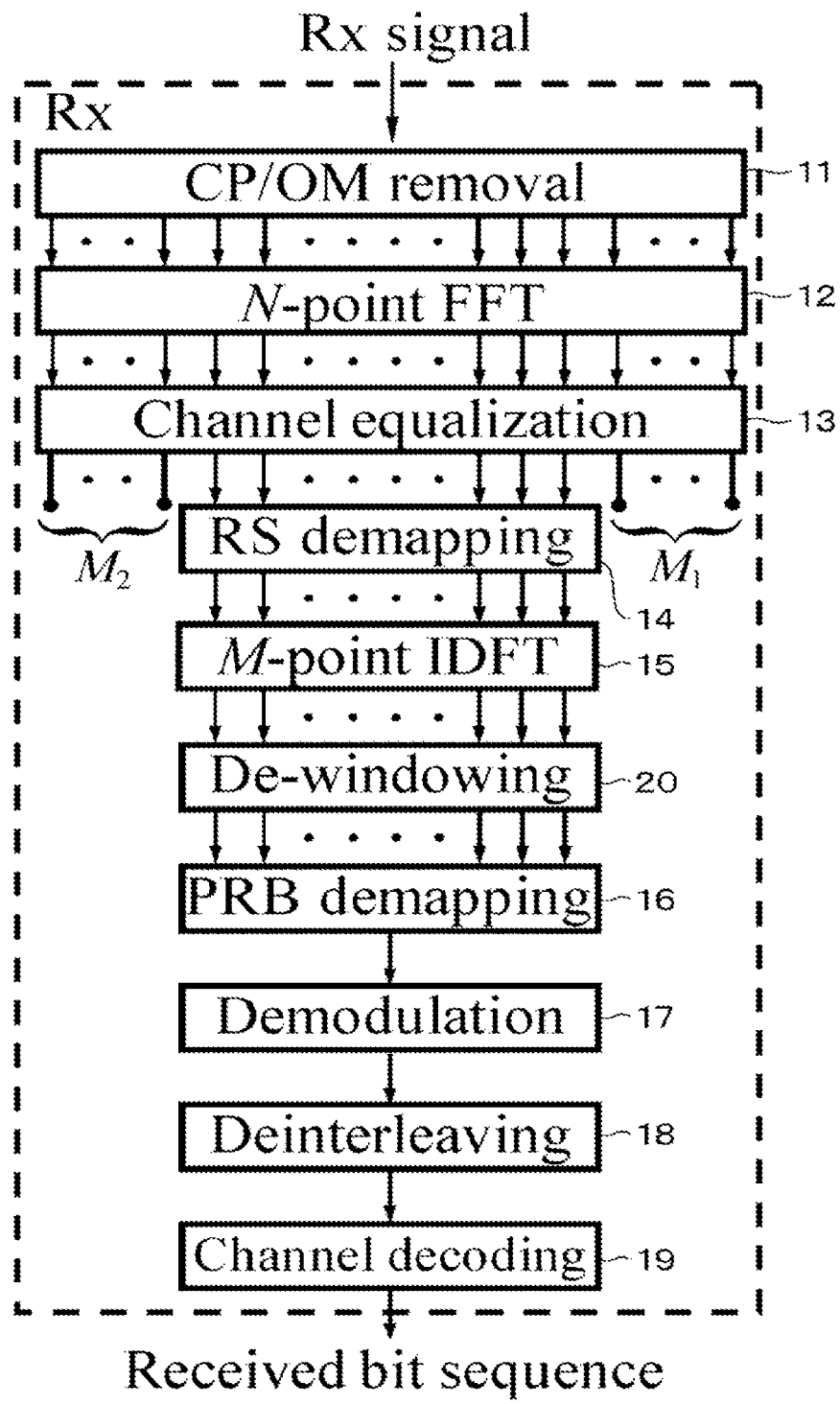
FIG. 4 is a block diagram illustrating a receiver configuration to which the present invention has been applied.

As illustrated in FIG. 3, in the receiver, first, a received signal is supplied to a CP and OM removal circuit 11, and, for a signal (Mathematical Formula 32) for which frame synchronization has been performed with respect to a UTW-SC-FDE received signal, N samples corresponding to a SC-FDE data symbol length are taken out, and a SC-FDE reception data symbol vector (Mathematical Formula 33) is obtained.

[Mathematical Formula 32]

$$r_k^{CP} \in \mathbb{C}^{N+N_G}$$

[Mathematical Formula 33]

$$r_k \in \mathbb{C}^N$$

[Mathematical Formula 34]

$$r_k = S_R r_k^{CP} \quad (15)$$

[Mathematical Formula 35]

$$S_R = [0^{N \times N_S}, I_N, 0^{N \times (N_G - N_S)}] \quad (16)$$

Here, (Mathematical Formula 36) is a unit matrix, and Ns is the number of sample points from a frame synchronization point to a synchronization point of a data symbol. Ns corresponds to an effective CP length, and the CP length is at a maximum when $N_S=N_G$, the amplitude distortion of the received signal due to UTW is at a minimum when $Ns=N_G/2$.

[Mathematical Formula 36]

$$I_N \in \mathbb{C}^{N \times N}$$

Next, after a reception data symbol vector (Mathematical Formula 37) is subjected to FFT processing by an N-point FFT circuit 12, an element corresponding to an allocated band is extracted, and channel equalization by a channel equalization circuit 13 is performed. Further, by performing IDFT processing by a RS de-mapping circuit 14 and an M-point IDFT circuit 15, a reception primary modulation symbol ((Mathematical formula 38) Equation (17)) is obtained.

[Mathematical Formula 37]

$$r_k$$

[Mathematical Formula 38]

$$b_k^W \in \mathbb{C}^M$$

[Mathematical Formula 39]

$$b_k^W = F_M D^{EQ} (F_S^{-1})^H r_k \quad (17)$$

Here, (Mathematical Formula 40) is a channel equalization matrix, and (Mathematical Formula 41) is a frequency-domain channel equalization weight vector.

[Mathematical Formula 40]

$$D^{EQ} = \text{diag}(d^{EQ}) \in \mathbb{C}^{M \times M}$$

[Mathematical Formula 41]

$$d_{EQ} \in \mathbb{C}^M$$

In the receiver configuration of the SC-FDE scheme of FIG. 3, (Mathematical formula 42) is used as a reception determination symbol. However, in the other example of the receiver configuration of FIG. 4, (Mathematical formula 43) is subjected to de-windowing processing, and a reception determination symbol (Mathematical formula 44) is obtained.

[Mathematical Formula 42]

$$b_k^W$$

[Mathematical Formula 43]

$$b_k^W$$

[Mathematical Formula 44]

$$b_k \in \mathbb{C}^{M \times M}$$

[Mathematical Formula 45]

$$b_k = (W^{SYMB})^{-1} b_k^W \quad (18)$$

In Equation (18), (Mathematical formula 46) is a de-windowing matrix, and is defined as follows.

[Mathematical Formula 46]

$$(W^{SYMB})^{-1} \in \mathbb{C}^{M \times M}$$

[Mathematical Formula 47]

$$W^{SYMB} = F_M^{-1} (F_S^{-1})^H W^{UTW,N} F_S^{-1} F_M \quad (19)$$

[Mathematical Formula 48]

$$W^{UTW,N} = \text{diag}(w^{UTW,N}) \quad (20)$$

[Mathematical Formula 49]

$$w^{UTW,N} = S_w w^{UTW} \quad (21)$$

[Mathematical Formula 50]

$$S_w = [0^{N \times (NM+N_S)} I_N 0^{N \times (NM+N_G-N_S)}] \quad (22)$$

Here, (Mathematical Formula 51) is a UTW matrix by which a range taken out as a data symbol on a receiving side is multiplied.

[Mathematical Formula 51]

$$W^{UTW,N}$$

"De-Windowing Processing"

Figure 5:
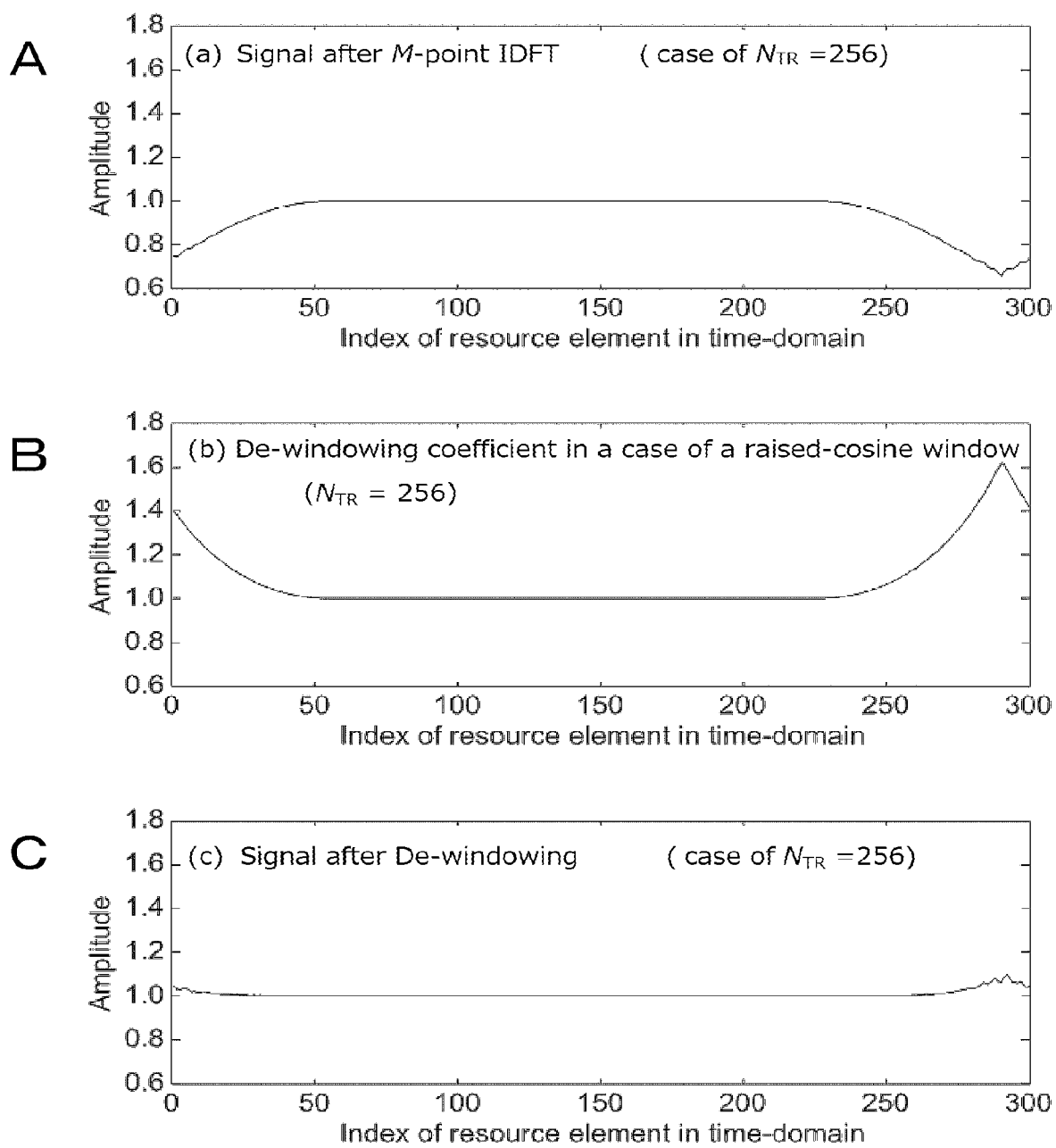
FIG. 5A, FIG. 5B and FIG. 5C are timing charts used to describe de-windowing processing.

FIG. 5 describes de-windowing processing. In FIG. 5, a horizontal axis represents an index of a resource element in the time-domain, and a vertical axis represents an amplitude. FIG. 5A is an output result from the M-point IDFT circuit 15 (FIG. 3 or FIG. 4) for a case of ($N_{TR}$=256). Due to windowing processing on a transmitting side, fluctuation occurs in an amplitude value in a time-domain resource element (RE) signal which is an output of M-point IDFT. The figure is an example in a case of a raised cosine window.

It is also possible to leave the fluctuation in the amplitude as it is, and perform reception demodulation processing of a later stage as in the conventional configuration of FIG. 3. However, when multilevel modulation such as 16 QAM or 64 QAM is used, communication quality may be affected by an amplitude fluctuation value. Here, when a type and a window length of a window function multiplied on the transmitting side are known on the receiver side, in an ideal state in which there is no propagation channel fluctuation or noise, what kind of amplitude fluctuation occurs in a signal after M-point IDFT processing on the receiver side can be determined in advance by calculation. Therefore, an inverse number of the amplitude fluctuation value determined in advance by calculation is used as a de-windowing coefficient (FIG. 5B), and an output result (FIG. 5A) of the M-point IDFT processing is multiplied by this coefficient. This is referred to as de-windowing processing. FIG. 5B illustrates a de-windowing coefficient in a case where, for example, a raised cosine window function ($N_{TR}$=256) is used. In the de-windowing circuit 20, the signal illustrated in FIG. 5A is multiplied by the de-windowing coefficient illustrated in FIG. 5B.

It can be seen that, as illustrated in FIG. 5C, in a signal after the de-windowing processing, a portion where an amplitude level at a signal end is decreased is compensated. As a result, accuracy of demodulation and decoding in the case where multilevel modulation such as 16 QAM or 64 QAM is used can be improved. However, influence of leaks from previous and subsequent symbols or the like cannot be eliminated and remain after the compensation.

3. Evaluation of Characteristics

"Evaluation of Out-of-Band Emission Characteristics"

OOBE characteristics (out-of-band emission suppression performance) of the UTW-SC-FDE scheme according to the present invention are evaluated by computer simulation using LTE signals to which specifications in Table 1 are applied.

TABLE 1

Evaluation LTE Signal Specifications

| Parameter | | Value |
|---|---|---|
| Channel bandwidth | | 5.0 MHz |
| Sampling frequency | | 7.58 MHz |
| DFT size M | | 300 |
| FFT size N | | 512 |
| CP rate | (1st symbol) | 40/512 |
| | (other symbols) | 36/512 |
| No. of resource blocks/slot | | 25 |
| No. of slots/subframe | | 2 |
| Occupied band | | 4.5 MHz |
| Guard band | | 0.25 MHz on both edge |

Figure 6:
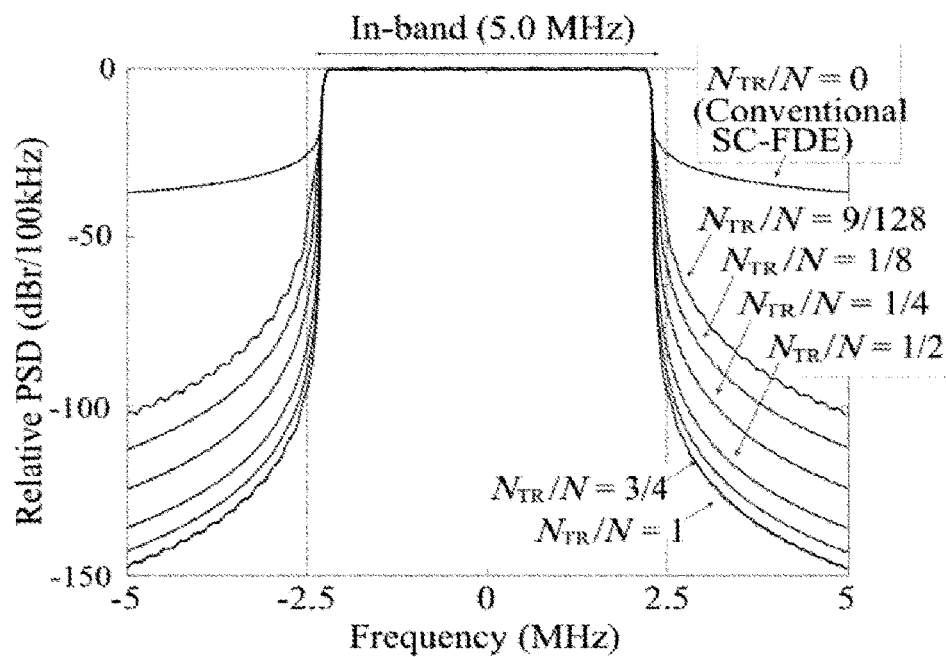
FIG. 6 is a graph showing average values of normalized power spectrum densities.

FIG. 6 shows average values of normalized power spectrum densities (PSDs) of the scheme of the present invention. Using QPSK as a primary modulation scheme and a raised cosine window function shown in Equation (14) as a window function, evaluation was performed under conditions of a resolution bandwidth of 100 kHz and a 4-times oversampling.

It can be seen from FIG. 6 that, in the present invention, OOBE can be sufficiently suppressed as compared to a conventional SC-FDE scheme, and the OOBE suppression performance improves as the window transition length $N_{TR}$ increases. Further, the same evaluation was performed using 16 QAM and 64 QAM as primary modulation schemes, and a relationship between a value $N_{TR}/N$, which is obtained by normalizing the UTW window transition length $N_{TR}$ by N that is applicable as a maximum value of $N_{TR}$, and a relative PSD at a channel band edge (channel-edge), that is, at a frequency that is 2.5 MHz away from a center frequency was evaluated.

Figure 7:
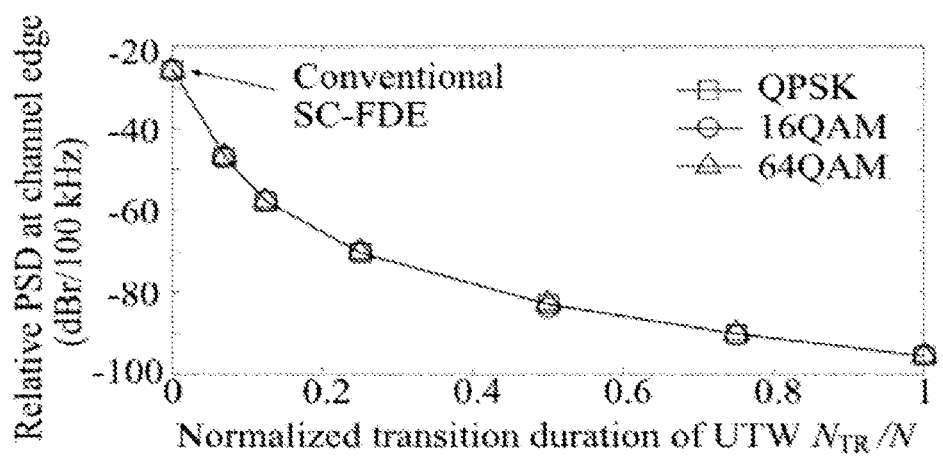
FIG. 7 is a graph for describing out-of-band emission suppression performance of the present invention.

It can be seen from FIG. 7 that the OOBE suppression performance at the channel-edge of the scheme of the present invention does not depend on the primary modulation scheme, and sufficient suppression can be achieved with respect to the SC-FDE scheme. Specifically, relative PSDs at a channel-edge for $N_{TR}/N$=9/128, 1/8, 1/4, 1/2, 3/4 and 1 are respectively improved by 21.5 dB, 32.4 dB, 45.0 dB, 57.5 dB, 64.8 dB and 70.2 dB as compared to the SC-FDE scheme. The condition of $N_{TR}/N$=9/128 is a condition in which the $N_{TR}$ is equal to a minimum value of the number of CP samples.

"Peak-to-Average Power Ratio (PAPR) Characteristics"

Figure 8:
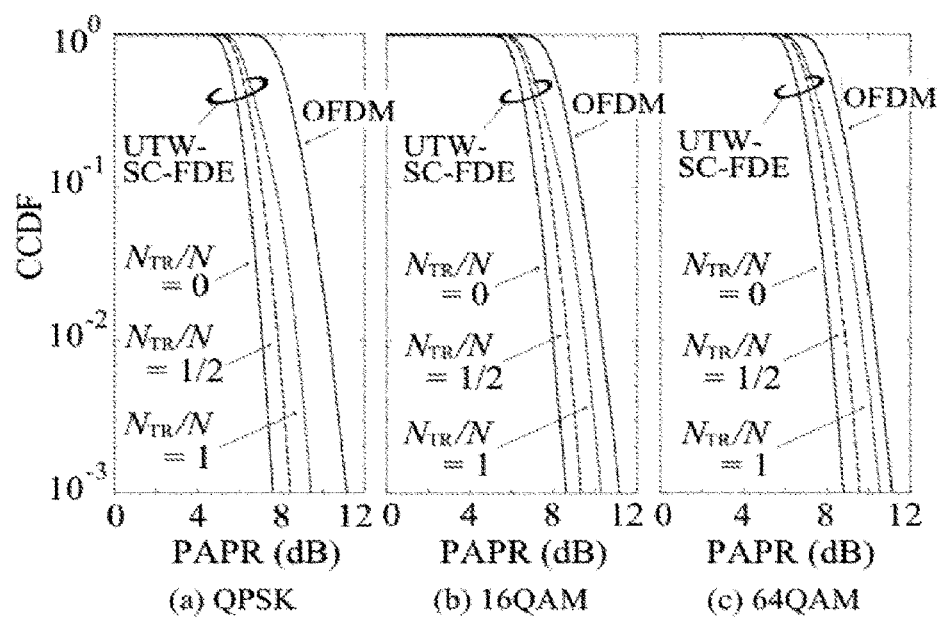
FIG. 8A, FIG. 8B and FIG. 8C are graphs showing complementary cumulative distribution functions to which the present invention has been applied.

PAPR characteristics according to the present invention were evaluated by computer simulation using LTE signals to which the specifications in Table 1 were applied. FIG. 8 shows a complementary cumulative distribution function (CCDF) of the PAPR in the LTE signals to which the scheme of the present invention has been applied, which represents a probability that a ratio of a peak power to an average power of one UTW-SC-FDE transmission symbol exceeds the PAPR of the horizontal axis. The evaluation was performed under each of conditions that the UTW transition lengths $N_{TR}$ are $N_{TR}/N$=0, 1/2 and 1 in each of QPSK, 16 QAM and 64 QAM as primary modulation schemes. Further, for comparison, evaluation in the OFDM scheme was also performed.

As shown in FIG. 8A, FIG. 8B and FIG. 8C, the PAPR characteristics deteriorate as the UTW transition length $N_{TR}$ increases. However, this is because a transition time of a UTW-SC-FDE transmission signal is increased by increasing the $N_{TR}$ and, as a result, an average power of the signal is decreased. In any one of the modulation schemes, under the condition that $N_{TR}/N$=1, that is, $N_{TR}$=512, PAPR deteriorates about 2 dB as compared to the SC-FDE scheme. However, better characteristics than the OFDM scheme are exhibited, and a low PAPR characteristic which is a feature of the SC-FDE scheme is not impaired.

"Block Error Rate (BLER) Characteristics"

About the scheme of the present invention, block error rate BLER characteristics under a frequency selective fading environment were evaluated by computer simulation. As a transmitter configuration, the one illustrated in FIG. 1 is used, and an LTE uplink signal that is shown in Table 1 and to which the scheme of the present invention has been applied is transmitted. Two receiver configurations including one of the conventional SC-FDE scheme (FIG. 3) and one of the scheme of the present invention (FIG. 4) were evaluated. For both of the receivers, channel estimation was performed by linear interpolation using a reference signal in an LTE uplink, and a minimum mean squared error equalization scheme was used for channel equalization.

Specifications of the computer simulation are shown in Table 2.

TABLE 2

Specifications in Evaluation of BLER Characteristics

| Item | Specification |
|---|---|
| Modulation and coding rate R | QPSK, R = 0.49 |
| | 16 QAM, R = 0.50 |
| | 64 QAM, R = 0.50 |
| Channel coding scheme | Convolutional turbo coding |
| Decoding scheme | Max-Log MAP |
| Decoding iteration | 5 |
| Universal time-domain window type | Raised cosine window |
| Channel model | Extended Typical Urban |
| Max Doppler frequency | 70 Hz |

Primary modulation schemes were QPSK, 16 QAM and 64 QAM, and encoding rates were respectively 0.49, 0.50, and 0.50. Further, as a channel model, an extended typical urban (ETU) model was used, and a center frequency was 2.5 GHz, and a maximum Doppler frequency was 70 Hz. This is a condition for which a movement speed of about 30 km/h is assumed. A maximum delay time of an incoming wave in the ETU model is 5.0 µs. A CP length of an LTE uplink signal in a normal CP mode is 4.7 µs and 5.0 µs and is equal to or less than the maximum delay time of the incoming wave. Therefore, in order to maximize an effective CP length at reception, the evaluation was performed with $N_S = N_G$.

"Evaluation Results for the Conventional Receiver Configuration"

Figure 9:
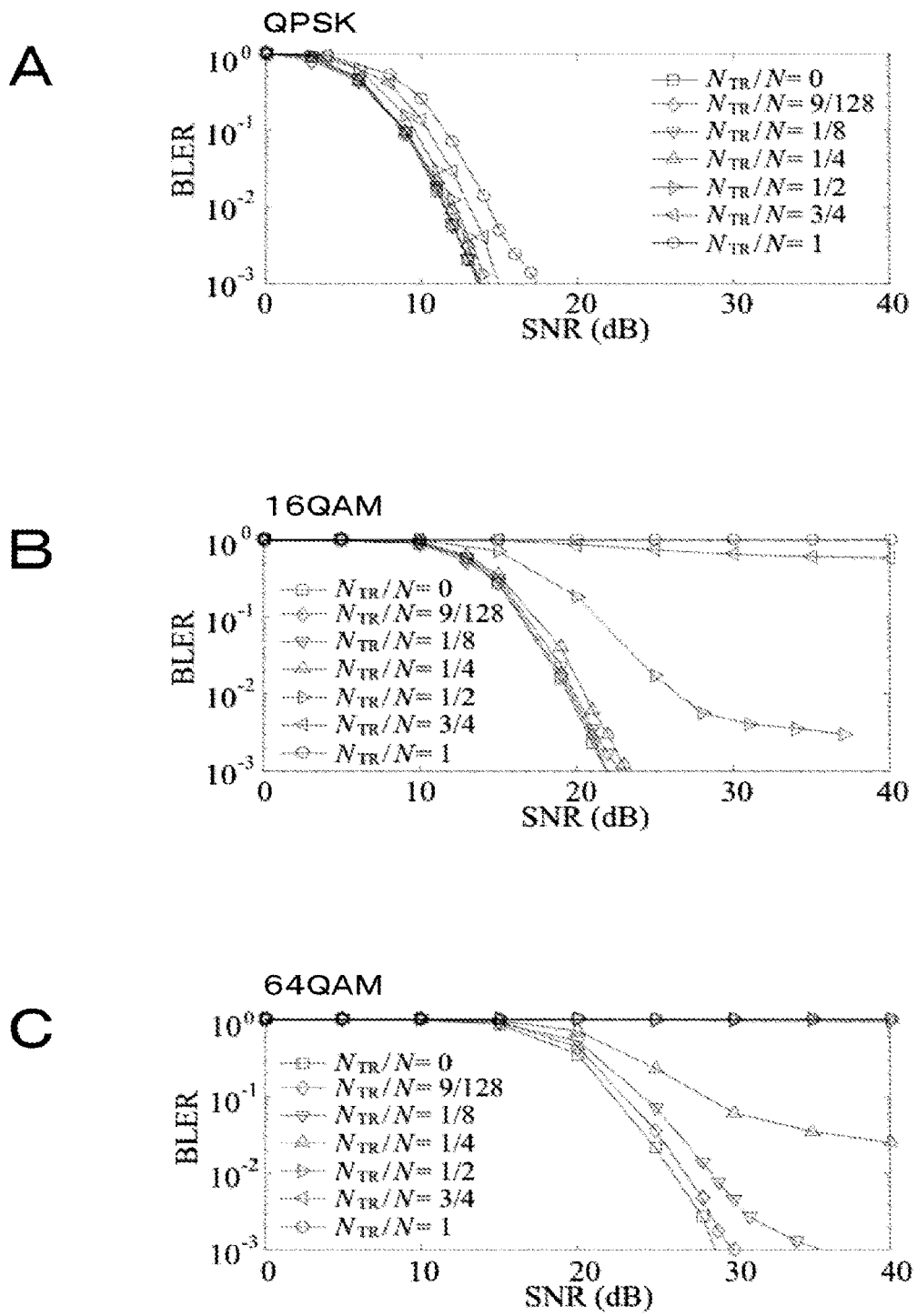
FIG. 9A, FIG. 9B and FIG. 9C are graphs showing BLER characteristics in a case where the conventional receiver configuration is used.

First, evaluation results of BLER characteristics with respect to SNR of the present invention in a case where the conventional receiver configuration (see FIG. 3) is used are shown in FIG. 9A, FIG. 9B and FIG. 9C. FIG. 9 are graphs in each of which a horizontal axis represents SNR and a vertical axis represents BLER. In QPSK (FIG. 9A), BLER=$10^{-3}$ is achieved under all conditions including $N_{TR}/N=1$ for which the UTW transition length $N_{TR}$ is maximized. In particular, at $N_{TR}/N=\frac{1}{2}$, although OOBE is improved by about 60 dB as compared to the conventional scheme, deterioration in SNR to achieve BLER=$10^{-3}$ is at most 0.6 dB.

In 16 QAM (FIG. 9B), BLER=$10^{-3}$ is achieved under conditions of $N_{TR}/N=0$, $\frac{9}{128}$, $\frac{1}{8}$ and $\frac{1}{4}$. In particular, at $N_{TR}/N=\frac{1}{4}$, although OOBE is improved by about 45.0 dB as compared to the conventional scheme, deterioration in SNR to achieve BLER=$10^{-3}$ is at most 0.8 dB.

In the case of 64 QAM (FIG. 9C), BLER=$10^{-3}$ is achieved under conditions of $N_{TR}/N=0$, $\frac{9}{128}$ and $\frac{1}{8}$. However, under conditions of $N_{TR}/N=\frac{1}{4}$, $\frac{1}{2}$, $\frac{3}{4}$ and 1, errors that are difficult to mitigate occur, and BLER=$10^{-3}$ is not achieved. This is because high-order modulation is particularly affected by intersymbol interference and intercarrier interference due to the window function. However, even when the conventional receiver configuration is used, the UTW-SC-FDE scheme of the present invention can improve OOBE by about 40 dB in the 64 QAM scheme.

"Evaluation Results for the Receiver Configuration in which De-Windowing is Introduced"

Figure 10:
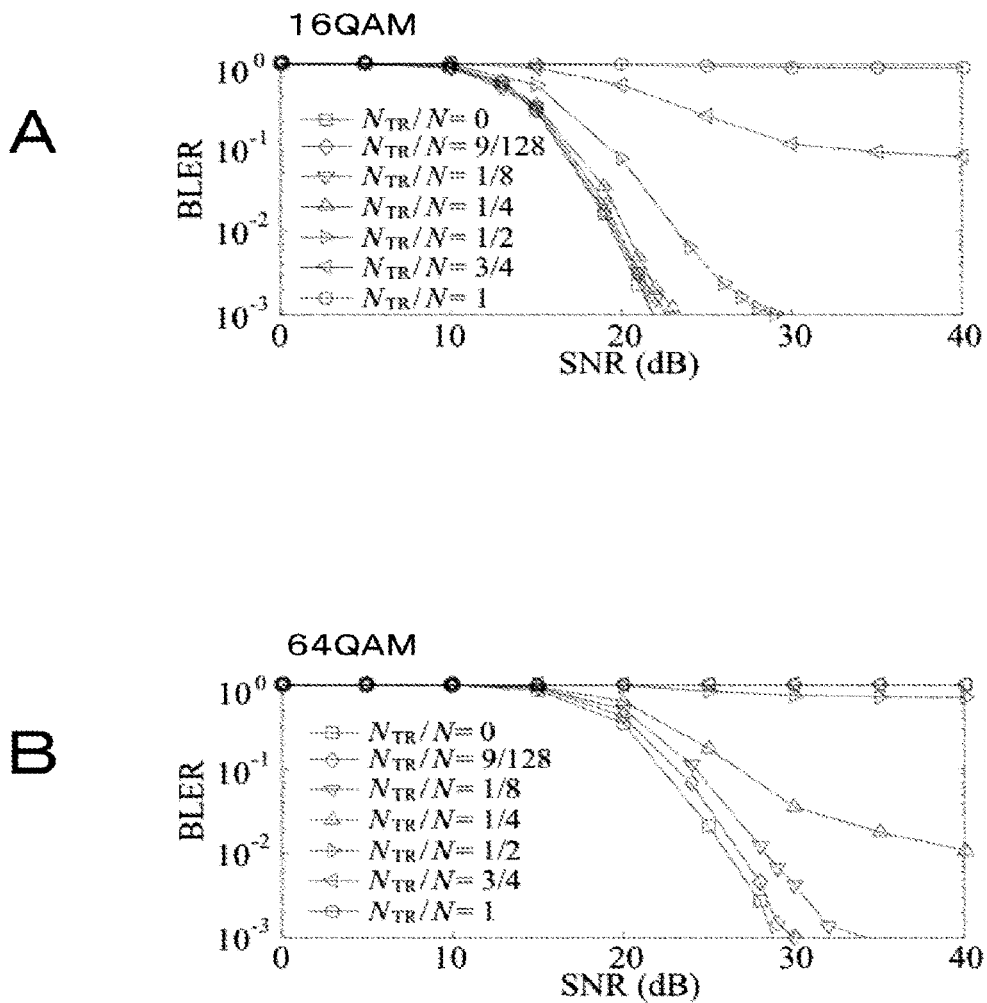
FIG. 10A and FIG. 10B are graphs showing BLER characteristics in a case where the receiver configuration of the present invention is used.

Next, BLER characteristics with respect to SNR in a case where the receiver configuration (FIG. 4) of the present invention in which de-windowing is introduced is applied are shown in FIG. 10A and FIG. 10B. In 16 QAM (FIG. 10A), BLER=$10^{-3}$ is achieved even under the condition of $N_{TR}/N=\frac{1}{2}$ under which BLER=$10^{-3}$ could not be achieved for the conventional receiver configuration (FIG. 3). Further, even under the conditions of $N_{TR}/N=\frac{3}{4}$ and 1, BLER at the time of a floor error is improved by about one order of magnitude. Also in 64 QAM (FIG. 10B), similarly, BLER at the time of a floor error is reduced by half under the conditions of $N_{TR}/N=\frac{1}{4}$ and $\frac{1}{2}$ as compared to the conventional receiver configuration.

"OOBE Vs UTW Transition Length ($N_{TR}$) Characteristics"

Figure 11:
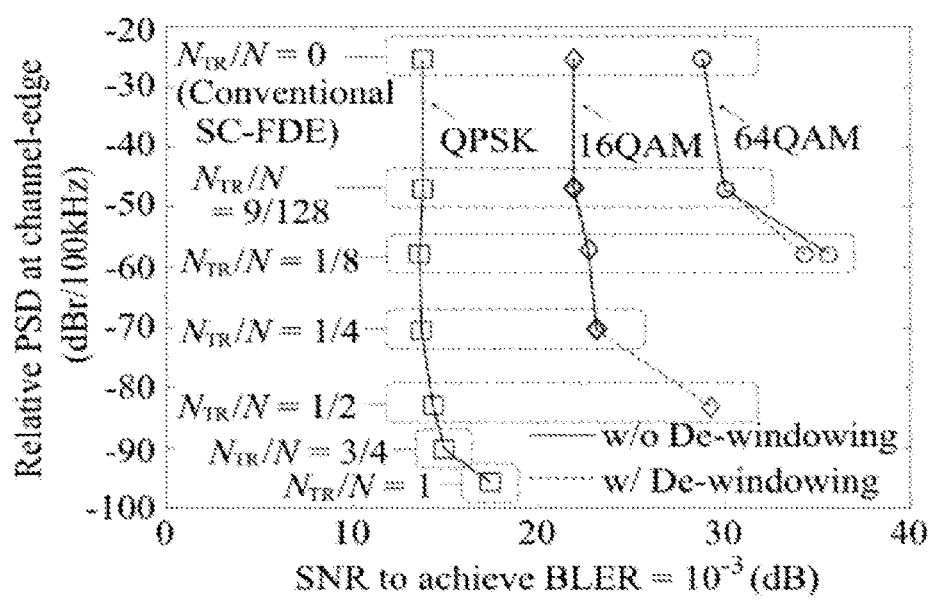
FIG. 11 is a graph showing a relationship between an SNR at which a BLER of $10^{-3}$ is achieved and OOBE at a channel edge.

Based on the results obtained so far, comprehensive evaluation of the OOBE suppression characteristics and the BLER characteristics of the scheme of the present invention was performed. FIG. 11 shows a relationship between the SNR at which BLER=$10^{-3}$ is achieved and the OOBE at the channel-edge, the relationship being evaluated by changing $N_{TR}/N$ for each of the primary modulation schemes.

In QPSK, even in the case where the conventional receiver configuration is used, without deterioration in the SNR at which BLER=$10^{-3}$ is achieved, OOBE at the channel-edge can be improved by about 60 dB as compared to the SC-FDE scheme. Further, when a deterioration of at most 3.6 dB is allowed for the SNR at which BLER=$10^{-3}$ is achieved, OOBE at the channel-edge can be improved up to 70.2 dB as compared to the SC-FDE scheme.

In 16 QAM, even in the case where the conventional receiver configuration is used, the OOBE at the channel-edge can be improved up to 45.0 dB while deterioration in the SNR at which BLER=$10^{-3}$ is achieved is suppressed to at most 1.3 dB. In 64 QAM, even in the case where the conventional receiver configuration is used, the OOBE at the channel-edge can be improved up to 32.4 dB while deterioration in the SNR at which BLER=$10^{-3}$ is achieved is suppressed to 6.8 dB. The deterioration in the SNR is improved to 5.4 dB by the introduction of de-windowing.

From the above results, it can be said that the scheme of the present invention is a scheme that can significantly reduce OOBE even under a frequency selective fading environment and is superior in terms of frequency utilization efficiency. An OOBE suppression effect and communication quality are in a trade-off relationship. However, in the case of QPSK, there is no particular problem. Even in a case of a high-order modulation mode such as 64 QAM, it is possible to sufficiently suppress OOBE while suppressing deterioration in communication quality by appropriate selection of $N_{TR}$ and application of de-windowing.

4. Modified Embodiment

A modified embodiment (partial-UTW processing) of the embodiment of the present invention is described with reference to FIG. 12 and FIG. 13. The UTW-SC-FDE scheme according to the present invention is a scheme in which, after a cyclic prefix (CP) and an overlap margin (OM) are inserted with respect to an SC-FDE data symbol, a universal time-domain window (UTW) is multiplied and then symbols are concatenated to generate a transmission signal. Here, a different UTW function may be applied for each resource element (RE).

Figure 12:
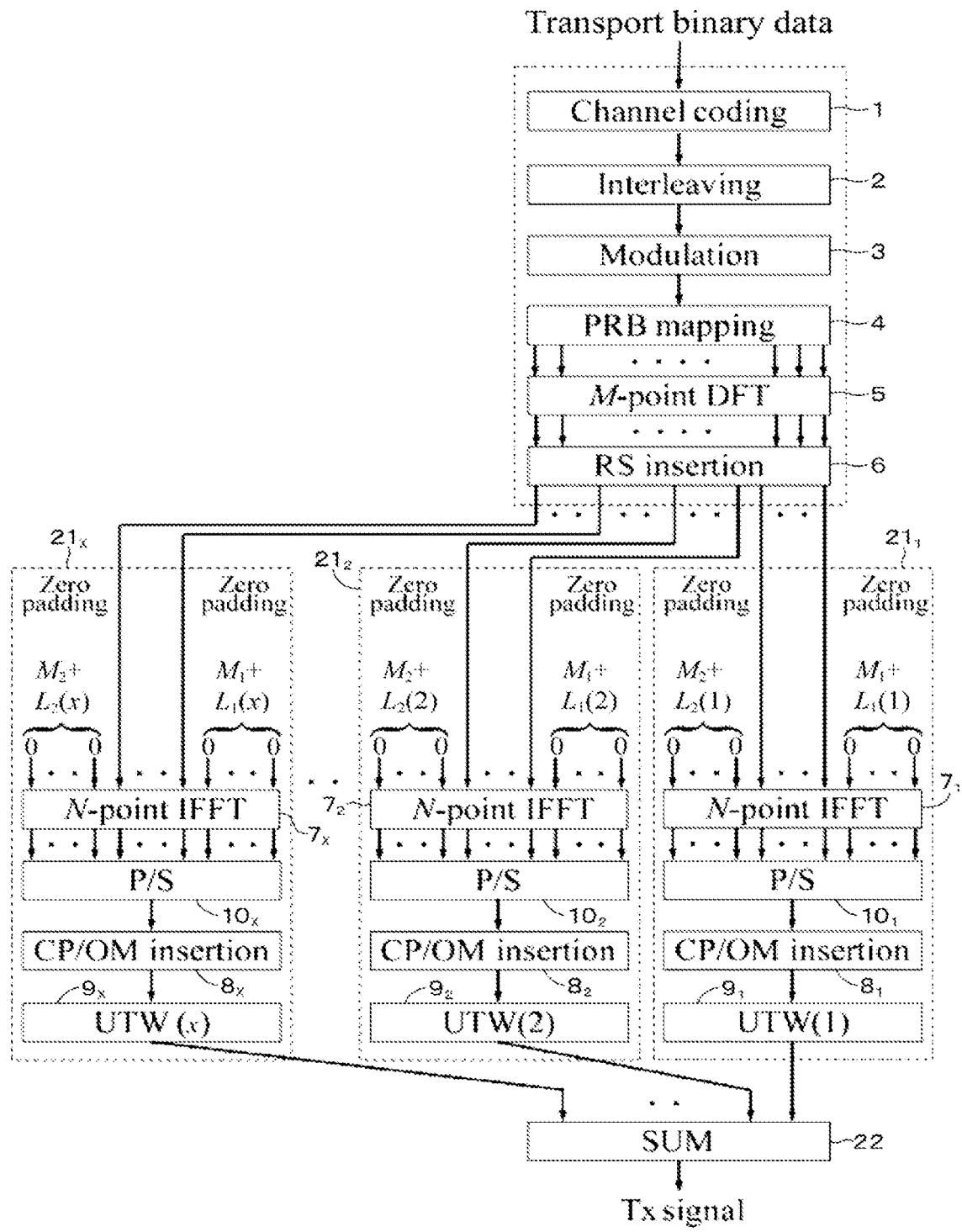
FIG. 12 is a block diagram for describing a transmission device of a modified embodiment of the present invention.
Figure 13:
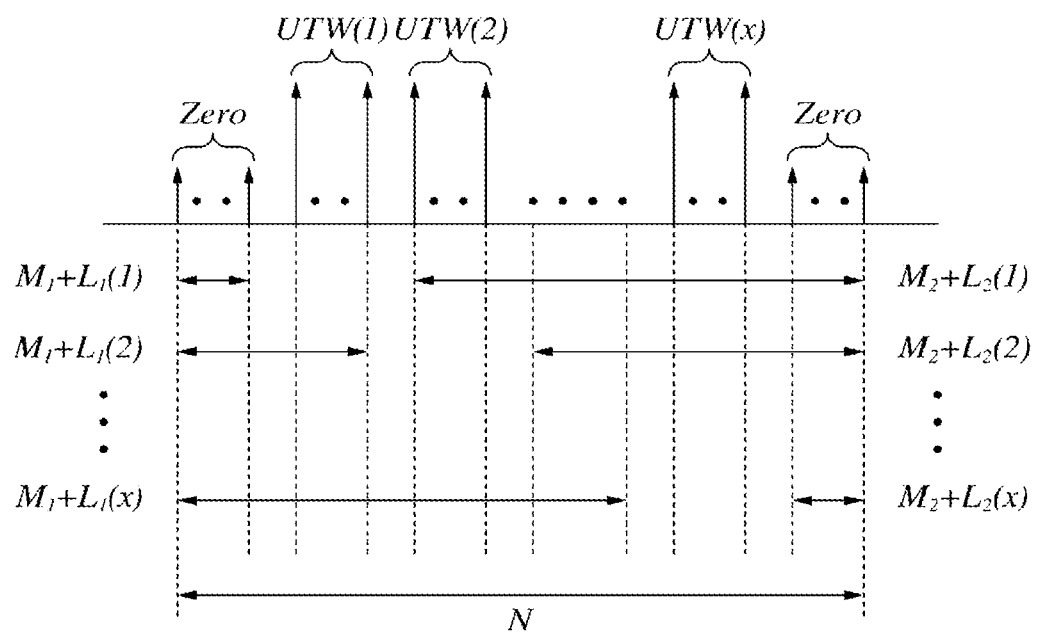
FIG. 13 is a graph for describing the transmission device of the modified embodiment of the present invention.

In the example illustrated in FIG. 12 and FIG. 13, resource elements (RE) are divided into x groups and an arbitrary UTW function is applied to each group. x processing parts $21_1$-$21_x$ are connected to an output side of the RS insertion circuit 6. The processing parts respectively have N-point IFFT circuits $7_1$-$7_x$, parallel serial conversion circuits $10_1$-$10_x$, CP and OM insertion circuits $8_1$-$8_x$, and time-domain windowing processing circuits $9_1$-$9_x$. UTW-SC-FDE symbols output from the processing parts $21_1$-$21_x$ are synthesized at a synthesizing circuit 22, and a transmission symbol is generated. In this case, when the same UTW function is applied to all the groups, a transmitter equivalent to that of FIG. 1 is obtained. As an example of the grouping of the REs, for example, a different UTW function may be applied to each resource block.

As described above, in the embodiment of the present invention, the OOBE at a channel edge can be suppressed up to 70.2 dB while deterioration in the PAPR characteristics can be suppressed to 2 dB or less with respect to the SC-FDE scheme regardless of a primary modulation scheme. Further, even in a frequency selective fading environment, in QPSK, OOBE can be improved by 57.5 dB with almost no deterioration in communication quality. Even in a high-order modulation mode such as 64 QAM, by introducing de-windowing to the receiver, the OOBE at the channel edge can be improved up to 32.4 dB while the SNR at which BLER=$10^{-3}$ is achieved is suppressed to 5.4 dB as compared to the SC-FDE scheme. The present invention can significantly reduce OOBE while suppressing deterioration in communication quality, and allows frequency utilization efficiency to be further improved. Therefore, it is a highly useful scheme that can flexibly respond to requirements from various applications and standards that are in practical use in a 5G system.

In the above, the embodiments of the present invention are specifically described. However, the present invention is not limited to the above-described embodiments, and various modifications based on the technical ideas of the present invention are possible.

DESCRIPTION OF REFERENCE NUMERALS

1: channel encoder
2: interleave circuit
3: modulator
4: PRB mapping circuit
11: CP and OM removal circuit
12: N-point FFT circuit
13: channel equalization circuit
14: RS de-mapping circuit
15: M-point IDFT circuit
20: de-windowing circuit

What is claimed is:

1. A transmission device of a single carrier frequency-domain equalization scheme, comprising:
a circuit in which a cyclic prefix (CP) and an overlap margin (OM) are inserted; and
a time-domain windowing processing circuit to which inputs a transmission symbol having a data part into which the CP and the OM have been inserted, wherein
the time-domain windowing processing circuit multiplies an arbitrary time-domain window function and suppresses out-of-band emission, and
in the time-domain windowing processing circuit, a window transition length of the time-domain window function is equal to or larger than a length of the CP and covers at least a portion of the data part.

2. A transmission device of a single carrier frequency-domain equalization scheme, comprising:
multiple circuits;
multiple time-domain windowing processing circuits coupled to the multiple circuits, wherein
a transmission symbol is divided into multiple groups for each resource element and symbols of the groups are input to the multiple time-domain windowing processing circuits after performing cyclic prefix (CP) and overlap margin (OM) insertion by the multiple circuits,
the multiple time-domain windowing processing circuits each multiply an arbitrary time-domain window function and suppress out-of-band emission.

3. A reception device, comprising:
a fast Fourier transform (FFT) circuit configured to perform FFT processing on a reception data symbol to obtain a frequency domain reception data symbol with respect to a single carrier-frequency domain equalization (SC-FDE) scheme,
a channel equalization circuit configured to perform channel equalization,
an inverse discrete Fourier transform (IDFT) circuit, coupled to the channel equalization circuit, configured to perform IDFT processing on the frequency domain reception data symbol to obtain a primary reception modulation symbol, and
a time domain de-windowing processing circuit, coupled to the IDFT circuit, configured to perform time domain de-windowing processing in which an inverse number of a window function, which is multiplied on a transmission side, is multiplied to compensate amplitude fluctuation that occurs at an output of the IDFT circuit.

4. A transmission method of a single carrier frequency-domain equalization scheme, comprising:
inserting a cyclic prefix (CP) and an overlap margin (OM); and
performing time-domain windowing processing in which inputs a transmission symbol into which the CP and the OM have been inserted, wherein
in the time-domain windowing processing, an arbitrary time-domain window function is multiplied and out-of-band emission is suppressed, and
in the time-domain windowing processing, a window transition length of the time-domain window function is equal to or larger than a length of the CP.

5. A reception method, comprising:
performing fast Fourier transform (FFT) processing on a reception data symbol to obtain a frequency domain reception data symbol with respect to a single carrier-frequency domain equalization (SC-FDE) scheme,
performing channel equalization;
performing inverse discrete Fourier transform (IDFT) processing on the frequency domain reception data symbol to obtain a reception primary modulation symbol; and
performing de-windowing processing in which an inverse number of a window function that is multiplied on a transmitting side is multiplied to compensate amplitude function that occurs after the IDFT processing.

\* \* \* \* \*